Aug. 20, 1957  M. FOX  2,803,019
DAVENPORT BED
Filed June 15, 1956  6 Sheets-Sheet 1

Inventor:
Martin Fox
By Schroeder, Hofgren,
Brady & Wegner
Attorneys

Aug. 20, 1957 M. FOX 2,803,019
DAVENPORT BED
Filed June 15, 1956 6 Sheets-Sheet 2
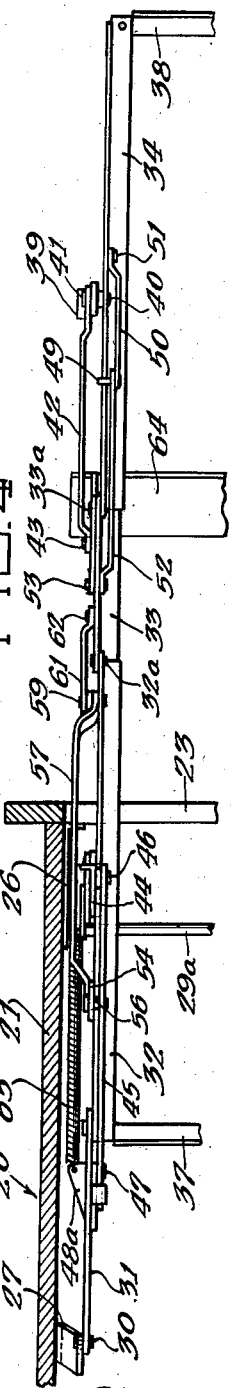
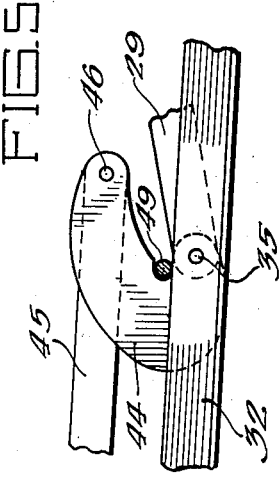
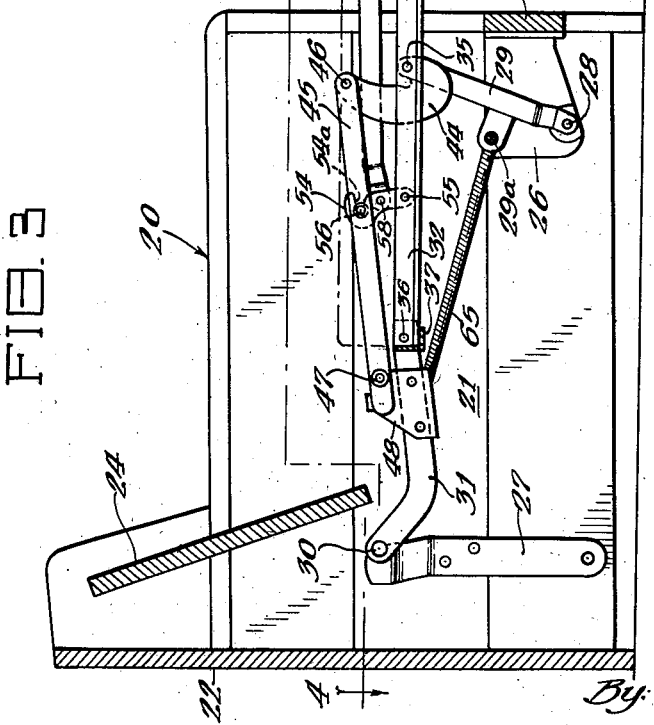
Inventor:
Martin Fox
By Schroeder, Hofgren,
Brady & Wegner
Attorneys

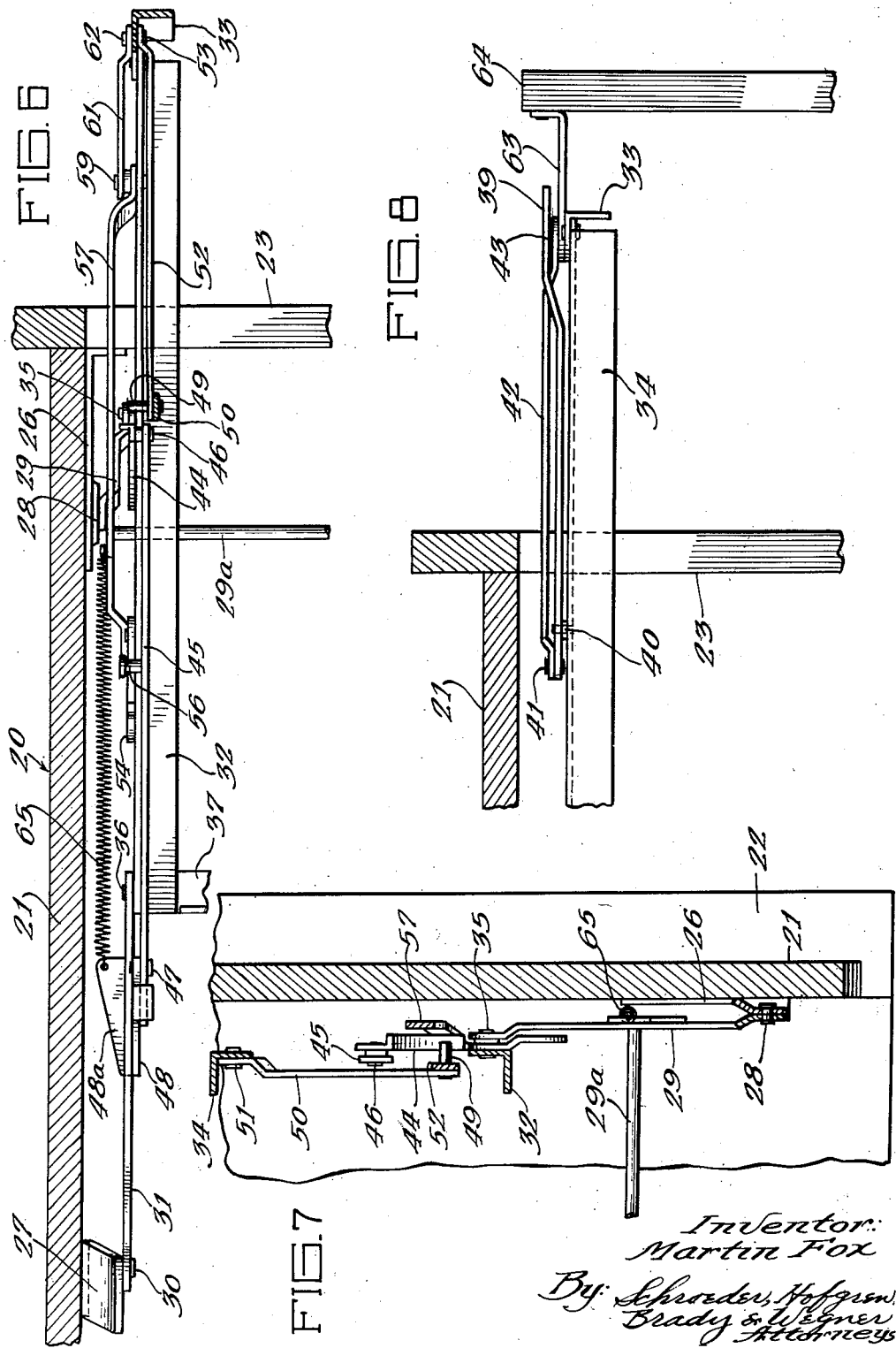

Aug. 20, 1957  M. FOX  2,803,019
DAVENPORT BED
Filed June 15, 1956  6 Sheets-Sheet 4

Inventor:
Martin Fox
By: Schroeder, Hofgren,
Brady & Wegner
Attorneys

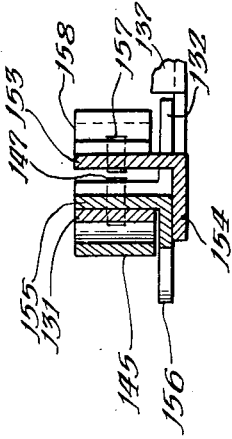
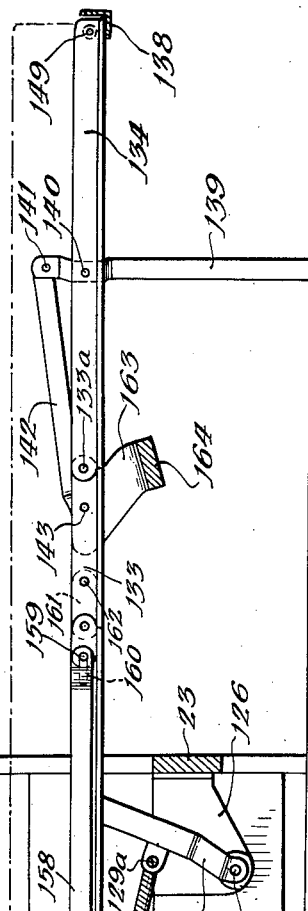
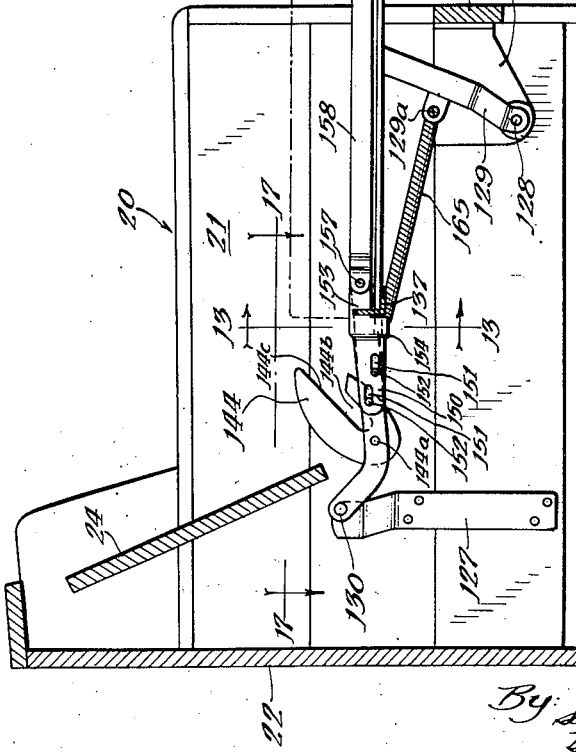
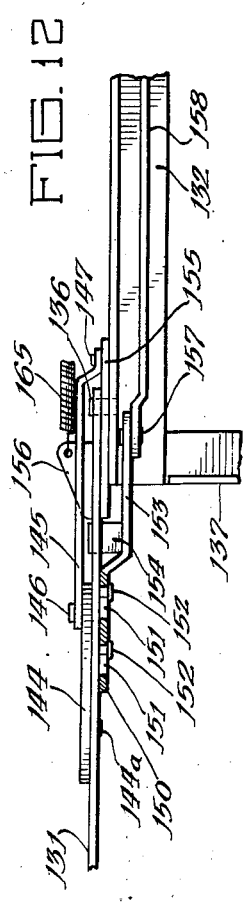

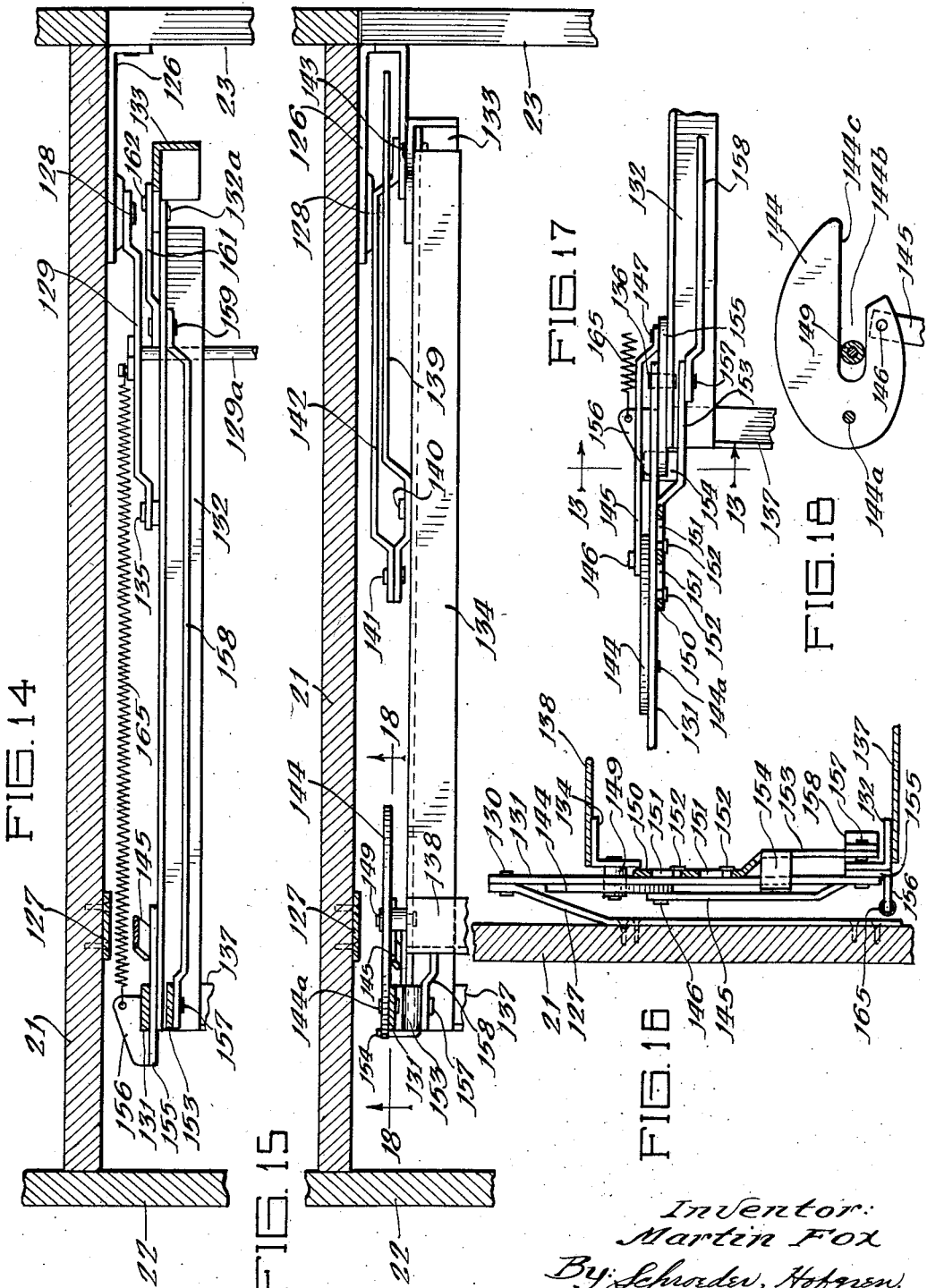

United States Patent Office 2,803,019
Patented Aug. 20, 1957

2,803,019

DAVENPORT BED

Martin Fox, Chicago, Ill., assignor to The Seng Company, a corporation of Illinois Application June 15, 1956, Serial No. 591,749

7 Claims. (Cl. 5—13)

This invention relates to an improved davenport bed of the type in which the bed, when unfolded, extends longitudinally between the arms of the davenport.

An object of the present invention is to provide a compact davenport bed which may be very easily moved between a folded davenport position within the davenport frame and a bed position extending forwardly of the davenport frame.

Another object of the invention is to provide a davenport bed in which the bed sections are firmly locked in a fixed position with respect to each other and with respect to the davenport frame in davenport position.

Yet another object of the invention is to provide a davenport bed in which the side of the bed which is positioned toward the rear of the davenport frame is hung on a pair of inner suspension links which occupy a substantially horizontal position when the bed bottom is in bed position, and in which the innermost bed section is locked with respect to the inner suspension links in said position.

The invention is illustrated in the accompanying drawings, in which:

Fig. 1, illustrating a first form of the invention, is a sectional view of a davenport frame with the folding bed bottom of the present invention folded into the frame in davenport position;

Fig. 3 is a view similar to Fig. 1, showing the bed bottom in extended bed position;

Fig. 4 is a fragmentary section taken as indicated along line 4—4 of Fig. 3;

Fig. 5 is a fragmentary section on an enlarged scale showing the section locking mechanism in davenport position;

Fig. 6 is a fragmentary section on an enlarged scale taken as indicated along the line 6—6 of Fig. 2;

Fig. 7 is a fragmentary section on an enlarged scale taken as indicated along the line 7—7 of Fig. 2;

Fig. 8 is a fragmentary section on an enlarged scale taken as indicated along the line 8—8 of Fig. 2;

Fig. 11 shows the embodiment of Fig. 9 in bed position;

Fig. 12 is a fragmentary section on an enlarged scale taken as indicated along the line 12—12 of Fig. 10;

Fig. 13 is a fragmentary section on an enlarged scale taken as indicated along the line 13—13 of Fig. 11;

Fig. 14 is a fragmentary section on an enlarged scale taken as indicated along the line 14—14 of Fig. 9;

Fig. 15 is a fragmentary section on an enlarged scale taken as indicated along the line 15—15 of Fig. 9;

Fig. 16 is a fragmentary section on an enlarged scale taken as indicated along the line 16—16 of Fig. 9;

Fig. 17 is a fragmentary section on an enlarged scale taken as indicated along the line 17—17 of Fig. 11; and Fig. 18 is a fragmentary section taken as indicated along the line 18—18 of Fig. 15.

Figure 1:
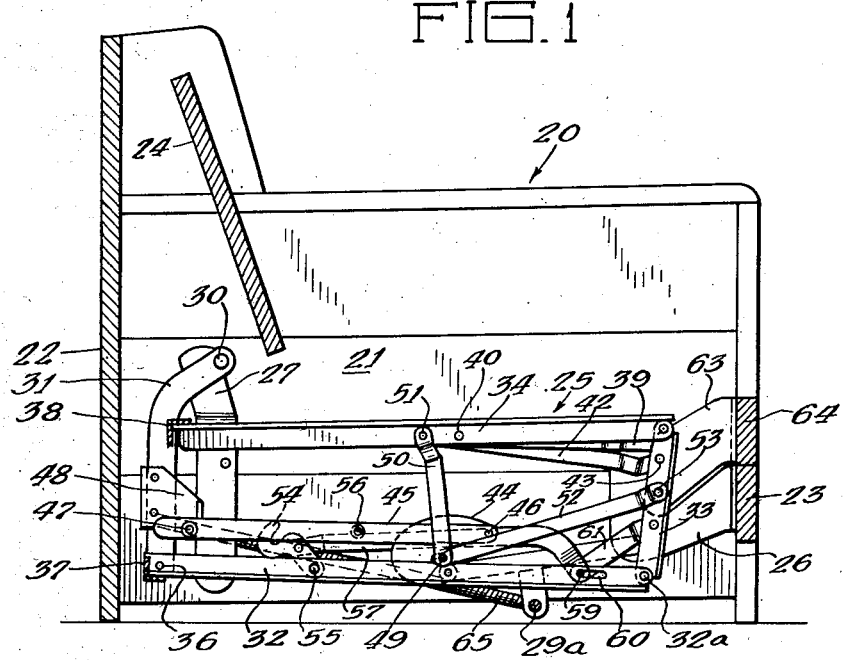

Referring to the drawings in greater detail, and referring first to the form of the device illustrated in Figs. 1–8, a davenport frame, indicated generally as 20, includes a pair of end frame members such as the end frame member 21 seen in the drawings, a back panel 22, a front rail 23 and a back rest 24. In the finished unit the frame is upholstered in the usual way. Mounted in the davenport frame 20 is a folding bed bottom mechanism, indicated generally as 25, which is the subject of the present invention. Preferably the folding bed bottom 25 is a prefabricated unitary structure which may be purchased by a furniture manufacturer for mounting in the davenport frame 20.

The folding bed bottom 25 includes two identical sets of mounting brackets and supporting links which are adapted to be secured to the two end rails 21 of the davenport frame. Since the mounting brackets and supporting links at the two ends of the davenport frame are identical, only one set is described in detail; and similarly a single set of bed end rails and operating linkages for the bed bottom will be described, although there are identical sets of rails and linkages at the two ends of the davenport frame.

Mounting elements for the bed bottom include a front angle bracket 26 which is adapted to be secured to the front rail 23 and end frame member 21, and an upright rear mounting bracket 27. Pivotally connected to the angle member 26 at 28 is a forward supporting arm 29, while pivotally connected to the upright bracket 27 at 30 is a rear suspension link 31.

The folding bed bottom itself consists of three articulated bed sections including an inner bed section 32, an intermediate bed section 33 hingedly connected to the section 32 at 32a, and an outer bed section 34 hingedly connected to the intermediate bed section at 33a. The foldable bed bottom is mounted on the supporting arms 29 and the links 31 by means of pivots 35 and 36, respectively. The bed bottom also includes a longitudinally extending inner side rail 37 which is effectively a part of the bed section 32, and an outer side rail 38 which is effectively a part of the outer bed section 34. The davenport bed here disclosed extends longitudinally within the sofa frame, so that the head of the bed is adjacent one end of the sofa frame and the foot of the bed is adjacent the other end. Thus, the inner rail 37 constitutes one side rail of the bed and the outer rail 38 the other side rail of the bed.

The bed bottom also includes a suitable flexible spring structure (not shown) upon which is supported a conventional inner-spring mattress, the position of which on the bed is indicated in broken lines.

As best seen in Fig. 3, the outer bed section 34 is provided with a folding leg 39 which is pivotally connected to the outer bed section 34 at 40, and a pivot 41 on the leg above the pivot 40 is connected to one end of a leg folding link 42 which, as best seen in Fig. 4, is pivotally connected to the intermediate bed section 33 at 43. Thus, when the bed bottom is folded from the extended bed position of Fig. 3 to the intermediate position of Fig. 2 the movement of the link folds the leg 39 as shown.

The bed bottom is provided with a section locking mechanism for locking the three bed sections in fixed relationship in davenport position, as seen in Fig. 1. The locking mechanism includes a roll-over lock 44 which is mounted on the pivotal connection 35 between the front supporting arm 39 and the inner bed section 32. A drive pitman 45 is pivotally connected to the roll-over lock 44 at 46, and by a pivot 47 is connected to an extension 48 on the inner suspension link 31. Thus, as the bed bottom is moved from the intermediate position of Fig. 2 to the davenport position of Fig. 1, the relative movement between the suspension link 31 and the inner bed section 32 moves the drive pitman 45 outwardly so as to rotate the roll-over lock 44 from the upright position of Figs. 2 and 3 to a locking position as shown in Fig. 1. In its locking position, the roll-over lock 44 engages a stud 49 which serves as the pivotal connection between a spacing and locking leg 50, which is pivoted at 51 on the outer bed section 34, and guide link 52 which is pivoted at 53 on the intermediate bed section 33.

Figure 2:
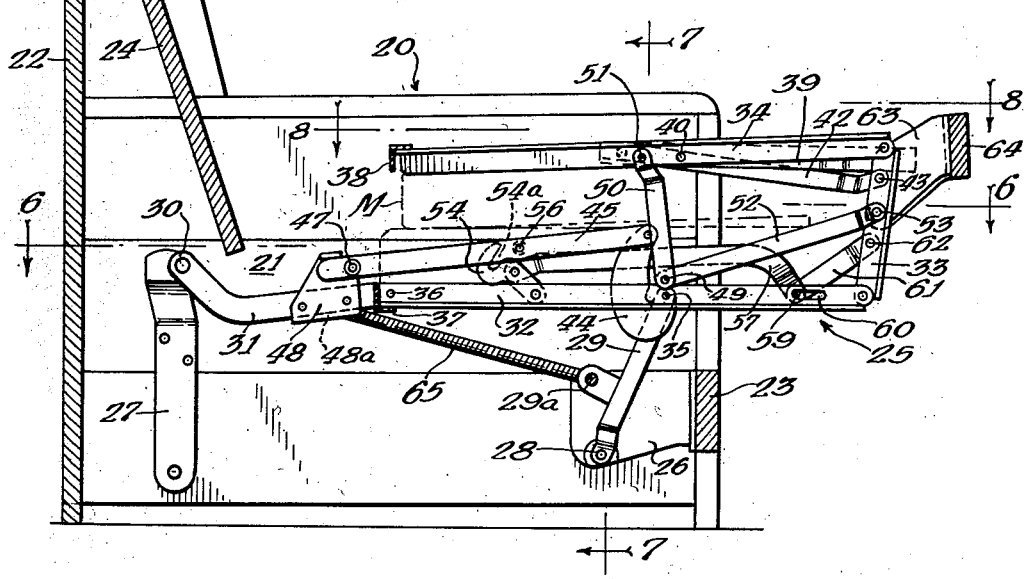
Fig. 2 is a view similar to Fig. 1, with the folding bed bottom in an intermediate position.

The relative positions of the inner suspension links 31 and the inner bed frame 32 in the bed position of Fig. 3 requires that the link and the bed section be locked together at their pivot 36. This is accomplished in the present form of the invention by a hook-like arm 54 which is pivotally connected at 55 to the inner bed section 32, together with a lock stud 56 which is mounted on the drive pitman 45 adjacent the arm 54. The pivoted arm 54 is movable between a retracted position as seen in Figs. 1 and 2, and a locking position as seen in Fig. 3, where it engages the stud 56. Movement of the locking arm 54 is effected by means of a link 57 which is pivotally connected to the hook at 58. At its outer end the link 57 is connected to a stud 59 which operates in a slot 60 in the inner bed section 32. As best seen in Figs. 1 and 2, a bracing link 61 is also connected to the pivot 59 and is pivotally connected at 62 to the intermediate bed section 33. Thus, when the bed is moved from the intermediate position of Fig. 2 to the bed position of Fig. 3, the relative movement between the intermediate bed section 33 and the inner bed section 32 draws the pin 59 on the bracing link 61 along the slot 60, and this action is transmitted through the actuating link 57 to the locking arm 54. Interengagement between the U-shaped notch 54a of the locking arm 54 and the stud 56 on the drive pitman 45 serves to lock the rear suspension link 31 and the inner bed section 32 against folding about the pivot 36 in bed position.

The bed bottom structure is completed by a pair of brackets 63 on intermediate bed section 33 to carry a front trim board 64, which is seen in Fig. 1 to rest immediately above the front frame member 23 of the davenport frame in davenport position. The bracket 63 and front trim board 64 provide stiffening for the bed frame between the side rails 37 and 38. Counterbalancing springs 65 for aiding in the folding and unfolding of the bed bottom are stretched between a torque rod 29a on the forward supporting arms 29 and a spring flange 48a on the bracket 48.

Referring now to the form of the invention illustrated in Figs. 9 to 18, the unit is similar to the first form except for the section lock and the lock between the inner section and the suspension links. There is a davenport frame 20 which is identical with that in the first form, having end frame members 21, a back panel 22, a front rail 23 and a back rest 24. In the davenport frame 20 is a folding bed bottom, indicated generally at 125, which includes a front mounting bracket 126 secured to the front rail 23 and a rear mounting bracket 127 secured to the end panel 21. Pivoted on the front bracket 126 at 128 is a front mounting arm 129, while pivoted on the rear mounting plate 127 at 130 is an inner suspension link 131. The components of the folding bed bottom itself include an inner bed section 132 pivoted at 132a to an intermediate bed section 133 which, in turn, is pivoted at 133a to an outer bed section 134. The inner bed section 132 is pivotally connected at 135 to the forward supporting arm 129 and is pivoted at 136 to the inner suspension link 131 so that the bed bottom may be swung in and out of the davenport frame on the arm 129 and the link 131. The bed frame also includes an inner side rail 137 and an outer side rail 138 which form parts, respectively, of the inner bed section 132 and the outer bed section 134.

The outer bed section 134 has a folding supporting leg 139 pivotally connected to it at 140, and the upper end of said leg is provided with a pivot 141 from which a leg actuating link 142 extends to a pivot 143 on the intermediate bed section.

Figure 9:
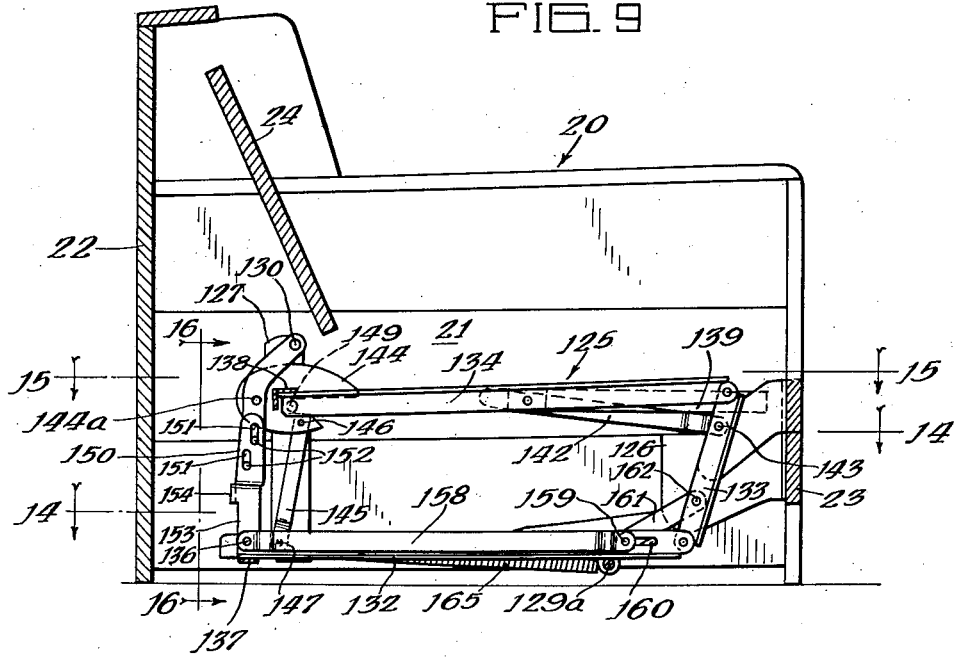
Fig. 9 is a view similar to Fig. 1, showing a second embodiment of the invention.
Figure 10:
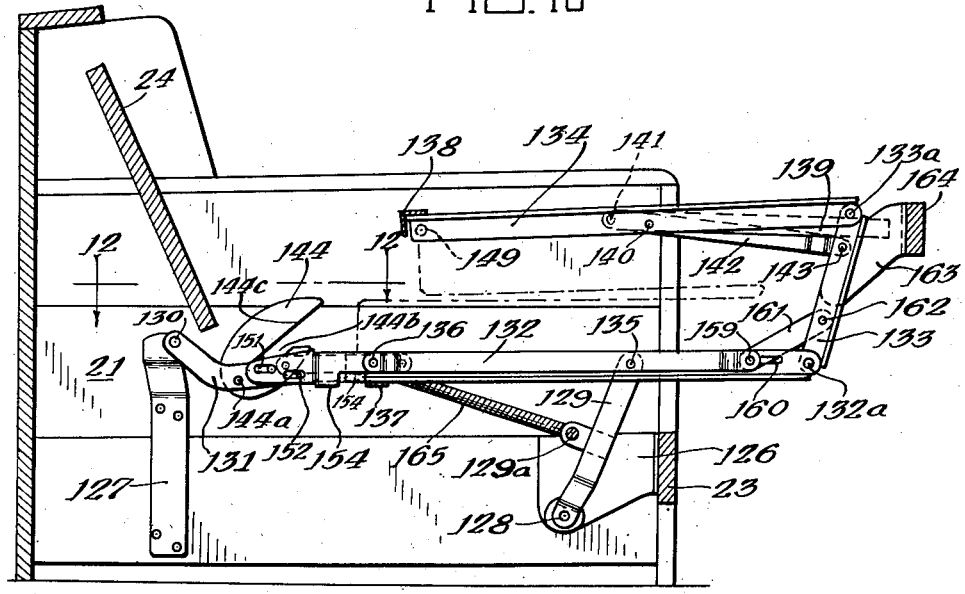
Fig. 10 shows the embodiment of Fig. 9 with the folding bed bottom in intermediate position.

A locking mechanism is provided for firmly securing the bed sections together in davenport position, and this mechanism includes a locking jaw 144 which is pivotally connected at 144a to the inner suspension link 131, and to which a drive pitman 145 is pivotally connected at 146, said drive pitman being also connected at 147 to the inner bed section 132. A fixed stud 149 at the extreme outer margin of the outer bed section 134 is adapted to engage a deep U-shaped notch 144b in the locking jaw 144 when the folding bed bottom 145 is in the davenport position of Fig. 9; and comparison of the intermediate position of Fig. 10 with the devenport position of Fig. 9 shows that as the stud 149 slides beneath the outwardly extending flat upper surface 144c of the notch 144b the link 145 rolls the lock member from an upwardly inclined position to a horizontal position so as to cam the stud 149 down and thus to tightly hold the outer bed section 134 in davenport position.

The second form of the folding davenport bed mechanism also contains means for locking together the inner suspension link 131 and the inner bed section 132 in the extended bed position of Fig. 11. The locking mechanism includes a lock member 150 having a pair of slots 151 which engage studs 152 on the inner suspension link 131, and the lock 150 has a forward portion 153 provided with a flange 154 which underlies the suspension link 131 in davenport position and in intermediate position. The inner bed section 132 has a fixed lock plate 155 which is provided with a horizontal flange 156 immediately adjacent the flange 154 on the sliding lock 150. At the forward end of the sliding lock 150 is a pin 157 for an actuating link 158 the forward end of which is connected to a pin 159 which travels in a slot 160 in the inner bed section 132, and also connected to the pin 159 is a bracing link 161 which is pivotally connected at 162 to the intermediate bed section 133. Thus, when the bed bottom is moved from the intermediate position of Fig. 10 to the bed position of Fig. 11 the unfolding action of the intermediate bed section 133 acts through the actuating link 158 to slide the lock member 150 forward on the pins 152 and bring the lock flange 154 into engagement with the underside of lock flange 156 on the inner bed section, as seen in Fig. 17. Thus, in bed position the inner suspension link 131 and the inner bed section 132 are locked together at their pivot 136.

The intermediate bed section is provided with brackets 163 for a trim board 164. A counterbalancing spring 165 which aids in folding and unfolding the bed bottom extends between a torque rod 129a on the forward mounting arms 129 and the flange 156 of the inner bed section 132.

The foregoing detailed description is given for clearness of understanding only and no unnecessary limitations are to be understood therefrom, as some modifications will be obvious to those skilled in the art.

I claim:

1. In a folding bed bottom for a davenport bed, in combination: a plurality of articulated bed sections including an inner bed section; supporting link means for swingable mounting said bed bottom in a davenport frame for movement between a folded davenport position and an extended bed position, said link means including a pair of inner suspension links each of which has a pivotal connection with the inner portion of said inner bed section; and locking means for securing said suspension links and said inner bed section against relative folding movement in extended position, said locking means including a first locking member operatively connected to one of said suspension links and adapted to be moved to a predetermined position early in the movement toward extended position, a second locking member on the inner bed section adjacent said predetermined position of said first locking member, and actuating means operatively connecting one of said locking members to another of said plurality of bed sections for moving said one of said locking members into engagement with the other of said locking members later in the movement to extended position.

2. The device of claim 1 in which the first locking member comprises a link pivotally connected with the suspension link and with the inner bed section and having thereon a stud, the second locking member comprises a movable arm on the inner bed section, and the actuating means comprises a link pivotally connected with said arm and with said other of said bed sections to move said arm into engagement with said stud during unfolding of said other section relative to the inner bed section.

3. The device of claim 1 in which the first locking member comprises a link pivotally connected with the suspension link and with the inner bed section and having thereon a stud, the second locking member comprises a pivoted arm on the inner bed section, said arm having a slot, and the actuating means comprises a link pivotally connected with said arm and with said other of said bed sections to pivot said arm and engage said slot with said stud during unfolding of said other section relative to the inner bed section.

4. The device of claim 1 in which the first locking member cmoprises a link making a pin and slot connection with the suspension link and having thereon a laterally projecting flange, the second locking member comprises a lateral projection on the inner bed section, and the actuating means comprises a link pivotally connected with the first locking member and with said other of said bed sections to slide said flange into engagement with said lateral projection during unfolding of said other section relative to the inner bed section.

5. The device of claim 4 in which the first locking member has two spaced slots engaging two spaced pins on the suspension link to maintain said locking member against rotation.

6. In a folding bed bottom for a davenport bed, in combination: a plurality of articulated bed sections including an inner bed section and an intermediate bed section pivotally connected thereto; a bracing link pivotally connected to said intermediate bed section and making a pin and slot connection with said inner bed section; supporting link means for swingably mounting said bed bottom in a davenport frame for movement between a folded davenport position and an extended bed position, said link means including a pair of inner suspension links each of which has a pivotal connection with the inner portion of said inner bed section; and locking means for secting said suspension links and said inner bed section against relative folding movement in extended position, said locking means including a first locking member operatively connected to one of said suspension links and adapted to be moved to a predetermined position early in the movement toward extended position, a second locking member on the inner bed section adjacent said predetermined position of said first locking member, and an actuating link pivotally connected to one of said locking members and to said bracing link for moving said one of said locking members into engagement with the other of said locking members during final movement to extended position.

7. In a folding bed bottom for a davenport bed, in combination: pivotally connected inner, outer and intermediate bed sections; supporting link means for swingably mounted said bed bottom in a davenport frame for movement between a folded position with said outer section overlying said inner section, and a coplanar bed position, said link means including a pair of inner suspension links each of which has a pivotal connection with the inner portion of said inner bed section; a roll-over lock pivotally mounted on said inner bed section; a drive pitman connecting said roll-over lock to one of said suspension links to pivot said lock by movement of said suspension link; a stud on said pitman; means including a pivoted arm on the outer bed section which is engaged by said roll-over lock to lock the inner and outer sections together in folded position; a pivoted arm on said inner section; and an actuating link connecting said arm with said intermediate section so that movement of the sections into extended position swings said arm into engagement with the stud on the pitman.

References Cited in the file of this patent
UNITED STATES PATENTS

| | | |
|---|---|---|
| 1,192,137 | Svebilius | July 25, 1916 |
| 2,595,038 | Woller | Apr. 29, 1952 |
| 2,749,559 | Petersen | June 12, 1956 |